US012536150B1

United States Patent
Arora et al.

(10) Patent No.: US 12,536,150 B1
(45) Date of Patent: Jan. 27, 2026

(54) SYSTEMS AND METHODS FOR LOW LATENCY WATCHES

(71) Applicant: Confluent, Inc., Mountain View, CA (US)

(72) Inventors: Abhishek Arora, Mountain View, CA (US); Austin Cawley-Edwards, Brooklyn, NY (US); Zdenek Tison, Omice (CZ); Arjun Mukherji, San Jose, CA (US); Arjun Satish, Los Gatos, CA (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 19/096,032

(22) Filed: Mar. 31, 2025

(51) Int. Cl.
　　*G06F 7/00*　　　(2006.01)
　　*G06F 16/23*　　 (2019.01)
　　*G06F 17/00*　　 (2019.01)

(52) U.S. Cl.
　　CPC ................. *G06F 16/2358* (2019.01)

(58) Field of Classification Search
　　None
　　See application file for complete search history.

(56) References Cited

U.S. PATENT DOCUMENTS

| | | | |
|---|---|---|---|
| 2021/0174223 A1* | 6/2021 | Dodwell | G06N 20/00 |
| 2022/0231961 A1* | 7/2022 | Cheng | H04L 47/62 |
| 2023/0231860 A1* | 7/2023 | Tian | G06N 5/022 |
| | | | 726/1 |

* cited by examiner

*Primary Examiner* — Tuan A Pham
(74) *Attorney, Agent, or Firm* — Schwegman Lundberg & Woessner, P.A.

(57) ABSTRACT

Systems and methods provide low-latency, ordered delivery of database change events to a watch client. In response to a database (DB) create, update, or delete (CUD) request, the system writes the request to a database. The database usually provides a change data capture stream of events to a publish/subscribe (pub/sub) system. This results in higher change event delivery latency and is referred to as a slow path. The system leverages a dual write approach, where the system asynchronously writes a corresponding change event directly to a fast path pub/sub system. A watch server consumes change events from the slow and fast path pub/sub systems and merges and orders the change events using a first-in first-out cache. An ordered event stream can be transmitted to the watch client with lower latency. The ordered event stream includes one or more batches, and each batch comprises a most recent change event version for each object that was changed.

18 Claims, 10 Drawing Sheets

SYSTEMS AND METHODS FOR LOW LATENCY WATCHES

TECHNICAL FIELD

The subject matter disclosed herein generally relates to monitoring for change events within a database. Specifically, the present disclosure addresses systems and methods for providing low latency event change notifications in watch services through a dual-path data streaming mechanism.

BACKGROUND

Distributed systems and cloud computing architectures play a significant role in modern computing. These systems often utilize event-driven architectures, where changes in data (change events) are captured and processed to ensure real-time updates and interactions. Achieving low-latency event processing in distributed systems is challenged by several obstacles, including network delays, variability in processing times, and the complexity of coordinating multiple components across different cloud service providers (CSPs). High latency and variability can lead to performance bottlenecks, affecting the overall efficiency and responsiveness of the system. Additionally, ensuring the durability and order of events while minimizing latency requires sophisticated mechanisms to handle potential data loss, out-of-order delivery, and system failures.

Existing solutions for event-driven architectures in distributed systems often rely on cloud-native integrations, such as AWS Lambda functions, to process CDC (change data capture) streams and deliver events to message brokers like Kafka. However, these solutions can experience high latency and variability, particularly during cold starts or under heavy load, which can compromise the timely delivery of events. Furthermore, while Kafka provides a durable event log, it does not naturally offer ultra-low latency, which is necessary for applications requiring, for example, sub-100 ms event processing.

BRIEF DESCRIPTION OF THE DRAWINGS

Various ones of the appended drawings merely illustrate examples of the present disclosure and should not be considered as limiting its scope.

DETAILED DESCRIPTION

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Example embodiments optimize the delivery of database change events by a watch server with minimal latency and high reliability by integrating a dual-path mechanism. The dual-path mechanism combines a slow path, which ensures strong guarantees of event ordering and no missing events, with a fast path optimized for low latency, albeit with potential for data loss or out-of-order events. The dual-path system leverages a first-in first-out (FIFO) cache in the watch server to manage and order the events from the dual paths.

In example embodiments, the FIFO cache acts as a moving time window, storing object identifiers and their corresponding versions to ensure effective deduplication and ordering of events. Each object is versioned and any update to an object increments its version by one in a database. As events arrive, the FIFO cache checks if the object identifier of an event is already present. If it is, the FIFO cache uses the stored version to determine whether the new event should be processed or discarded. If the object is not in the FIFO cache and the event's timestamp is outside the cache's effective time window, a database lookup may be performed to retrieve the latest version from the database. The FIFO cache can handle out-of-order and delayed events efficiently, maintaining data integrity and minimizing latency in the delivery of an event stream to a client. As such, example embodiments provide a technical solution to the technical problem of reducing latency in a watch service.

Figure 1:
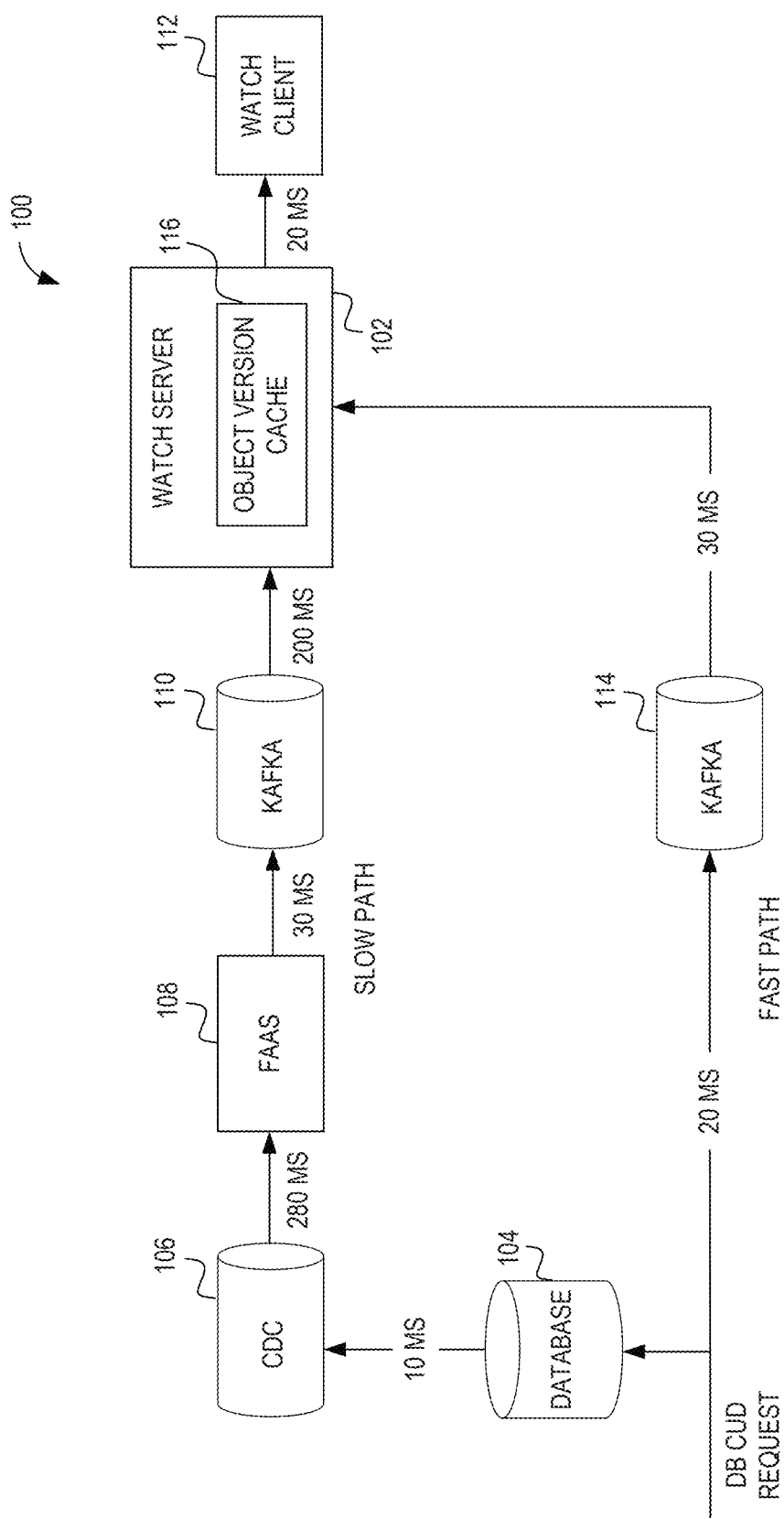
FIG. 1 is a diagram illustrating an example architecture for providing low latency watches, according to example embodiments.

FIG. 1 is a diagram illustrating an example architecture 100 for providing low latency watches, according to example embodiments. The architecture 100 comprises a dual-path data streaming system that is designed to optimize event delivery latency and ordering in a distributed cloud environment. The dual paths comprises a slow path, which ensures strong guarantees of event ordering and no missing events, and a fast path optimized for low latency. In example embodiments, the slow path comprises a conventional path that is typically used to stream events to a watch server 102.

In example embodiments, a system that hosts a remote procedure call framework receives a service application programming interface (API) call with a database (DB) CUD (create, update, and delete) request. This DB CUD request triggers the system to perform a write operation to a database 102 involving changes to objects in the database 104. In some examples, the database 102 is a cloud provider (CP) database such as such as DynamoDB and AWS Cosmos Along the slow path, changes are captured from the database 104 by a change data capture (CDC) 106. In a typical example, it can take 10 ms for the CDC 106 to capture the changes. The CDC 106 then streams the changes for further processing to a FaaS (Function as a Service) 108. The CDC stream to the FaaS 108 can add another 280 ms in latency.

The FaaS 108 comprises a cloud function that processes the CDC stream and forwards the changes (also referred to herein as "events" or "change events") to Kafka 110 (also referred to herein as "slow path Kafka). The forwarding of the events can add a further 30 ms to the latency. In one embodiment, the FaaS 108 is AWS Lambda but can be any equivalent connector function.

Kafka 110 is an event streaming platform that manages topics of different types and is used to handle the ingestion of the change data capture (CDC) streams from the database 104 via the FaaS 108. Kafka 110 serves as a source of data that are consumed by the watch server 102. In some embodiments, Kafka 110 organizes the data (e.g., message) into topics based on object type or kind. That is, each object type has its own dedicated topic within Kafka 110. Object type refers to types of entities or data, such as users, customers, countries, and so forth.

Kafka 110 interacts with the watch server 102 by providing necessary data streams that the watch server 102 processes and distributes to client subscriptions via a watch client 112. In a typical example, the slow path from Kafka to the watch server 102 can introduce another 200 ms latency.

As such, the total latency from the database 104 to the watch server 102 along the slow path amounts to 520 ms. The slow path can have high variability and high P99 (e.g., a high 99th percentile latency value). High P99 latency can signal performance bottlenecks or inefficiencies under heavy load. In some cases, high P99 can mean up to a one second delay.

Because the slow path comprises cloud native integration, it is not possible to directly lower the latency. As such, example embodiments integrate the fast path into the architecture 100. Returning to the database 104, the system perform a check once the write to the database 104 is completed. If the write is successful, then the system performs an asynchronous write of change events directly to a fast path Kafka 114. This write occurs in parallel and without waiting for the slow path Kafka 110 to respond back to a client that made the API call with the DB CUD request. As such, the system is configured to write to the database 104, check for the successful write, and the write the corresponding change events to the fast path Kafka 114. In one example, the system is a metadata platform provided by Confluent™.

In example embodiments, the fast path Kafka 114 comprises a single topic that includes all object types within the single topic. However, the fast path Kafka 114 can comprise more partitions than the per object type (or kind) topic in the slow path Kafka 110. By writing directly to the fast path Kafka 114, thus bypassing the CDC 106 and FaaS 108, latency is greatly reduced.

The fast path is a best effort process. It attempts to perform operations and deliver data with the highest possible speed and minimal latency, but without guaranteeing success or reliability. As such, the fast path is not durable and does not ensure that all data will be delivered or delivered in the correct order because the write to the fast path Kafka 114 can fail. Thus, there can be missing events or out-of-order events in the fast path.

To further reduce latency in the fast path, aggressive consumer polling can be used to reduce an interval at which a Kafka consumer in the watch server 102 checks for new messages in a topic. In the embodiment of FIG. 1, the polling interval is set to 30 ms for the fast path instead of a default 200 ms for the slow path. With a shorter polling interval, the time between when a message is produced in the fast path Kafka 114 and when it is consumed by the watch server 102 is minimized, leading to faster delivery of events to the watch server 102. Thus, when there is a new event in the fast path Kafka 114, in a worst case, the new event will be delayed by 30 ms.

The watch server 102 processes events from both the slow path and the fast path. This is possible due to the watch server 102 having an object version cache 116. In some cases, there is one object version cache per watch session. The object version cache 116 is a first-in first-out cache that is configured to ensure a correct ordering and deduplication of events received from both the slow path and the fast path.

In example embodiments, the object version cache 116 acts as a moving time window. A duration of the time window depends on an event rate and cache size. The object version cache 116 stores object identifiers (IDs) and their corresponding versions. An update to an object in the database 104 increments its version. A timestamp of each object ID is based on when (e.g., wall clock) it is inserted into the object version cache 116. The timestamp is referred to as put_ts. A min put_ts is the put_ts of the oldest/last object in the object version cache 116.

When an event arrives, the object version cache 116 checks if the object ID is already in the object version cache 116. If the object ID is in the object version cache 116, the object version cache 116 uses the stored version to determine whether the new event should be processed or discarded. However, if the object ID is not in the object version cache 116, the watch server 102 may, in some embodiments, perform a database lookup to obtain the latest version (e.g., do a DB Get ( ) if object_ts<cache min put_ts, where object_ts is the last modified timestamp of the object). This happens for an event that is delayed beyond the cache time window. The object version cache 116 is then updated with the version that is delivered to the client. For example, a cache size of 30K (3 MB)/session with an event rate of 1K/sec provides a 30 second window. Slow path and fast path P99 latency is 1 second. As such, the watch server 102 should be able to order>>99% of events effectively with the object version cache 116 without explicit DB GETs ( ).

The object version cache 116 supports compaction. This means the object version cache 116 only retains the latest version for an object within a batch of events. Because the object version cache 116 only stores object versions that are to be sent to the client, if a smaller version arrives, it is ignored. Various examples of ordering, deduping, and compaction will be discussed in connection with FIG. 3-FIG. 7.

The fast path is designed to deliver events with minimal latency, but it can lose events or deliver them out of order. To maintain the integrity of the event stream, the watch server 102 must ensure that fast path events can be effectively processed by the object version cache 116. If the fast path events are delayed by more than a threshold amount of time (e.g., 10 seconds), the fast path can be dropped as the main purpose of fast path is to reduce latency. This helps in avoiding unnecessary database lookups due to delayed fast path events, as the slow path is going to cover (or already has covered) these delayed fast path event.

While the embodiments of FIG. 1 have been discussed using Kafka in both the slow path and fast path, alternative embodiments can use any publish/subscribe (pub/sub) system in place of Kafka or in addition to Kafka.

Figure 2:
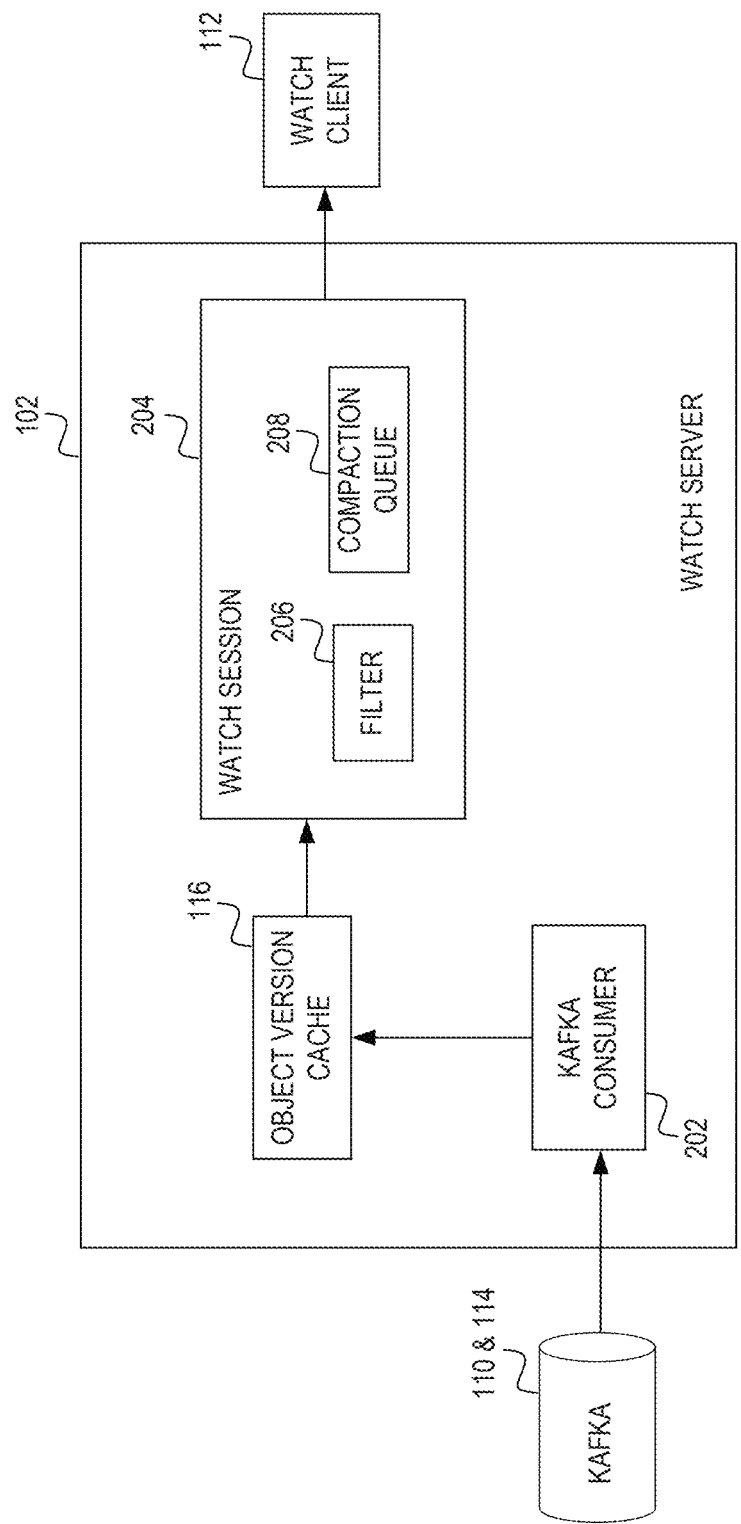
FIG. 2 is a diagram illustrating components of an example watch server, according to example embodiments.

FIG. 2 is a diagram illustrating components of the example watch server 102, according to example embodiments. The watch server 102 plays a crucial role in processing and delivering events from both the slow path and the fast path to the watch client 112. A Kafka consumer 202 is responsible for consuming data streams (e.g., events) from Kafka 110 and 114. The Kafka consumer 202 processes the events and uses the object version cache 116 to manage deduplication and ordering.

The object version cache 116 is a FIFO cache that acts as a moving time window, storing object IDs and their corresponding versions. The object version cache 116 is used to deduplicate and order events from both the slow path and the fast path. In example embodiments, the object version cache 116 ensures that only the latest version of an object is sent to the watch client 112.

The Kafka consumer 202 can be associated with a watch session 204. In some embodiments, the watch session 204 comprises a filter 206 and/or a compaction queue 208. The filter 206 is configured to apply user-defined criteria (based on a watch subscription) to the events consumed by the Kafka consumer 202 and ordered and deduped by the object version cache 116. By filtering the events based on the user-defined criteria, only events matching the user-defined conditions are sent to the watch client 112.

The compaction queue 208 takes the ordered events from the object version cache 116 (or the filter 206 if present) and organizes the events into batches and applies compaction to ensure that only the latest version of each object is included in each batch. The compaction queue 208 helps optimize the data sent to the watch client 112 by reducing redundancy and ensuring that the watch client 112 receives the most up-to-date information.

Thus, example embodiments combine events from two different paths to reduce latency in providing notifications to watch clients. The most difficult part of combining the events is providing ordering guarantee. Various examples illustrating ordering, deduping, and compaction are discussed in FIG. 3-FIG. 7. The examples illustrate object versions that are for a single object ID and only care about ordering per object ID.

In example embodiments, each object ID inserted into a cache (e.g., the object version cache 116) is associated with a timestamp at which the object is inserted in the cache, known as the put timestamp (put_tsput_ts). The cache maintains a minimum put timestamp (min put_ts), which represents an oldest entry in the cache. As such, the moving time window is defined by a range from a current time to min put_ts. This window reflects a period during which events are considered recent and can be effectively deduplicated and ordered by the cache.

When a new event arrives, its timestamp (object modified timestamp, object_ts) is compared to the min put_ts of the cache. If the object_ts is greater than min put_ts, the event is considered to be within the cache's effective time window. This implies that any out-of-order event for the same object ID should also be within this window, and the cache can handle it without needing a database lookup. The event is either updated in the cache if it has a higher version or discarded if it has a lower version.

However, if object_ts is less than min put_ts, the event is considered delayed beyond the cache's time window. In this case, the cache may not have the necessary information to deduplicate or order the event, prompting, in some cases, a database lookup to retrieve the latest version of the object. By leveraging the time window, example embodiments can avoid unnecessary database lookups for events that are within the time window. Based on event rate, and P99 or P99.9 latencies, the cache size can be tuned (=event rate× latency) so that on cache miss, database lookups can be avoided for 99% or 99.9% of cases. For events outside the time window, the database lookup ensures that the most recent state of the object is retrieved, maintaining the integrity and order of the event stream.

Figure 3:
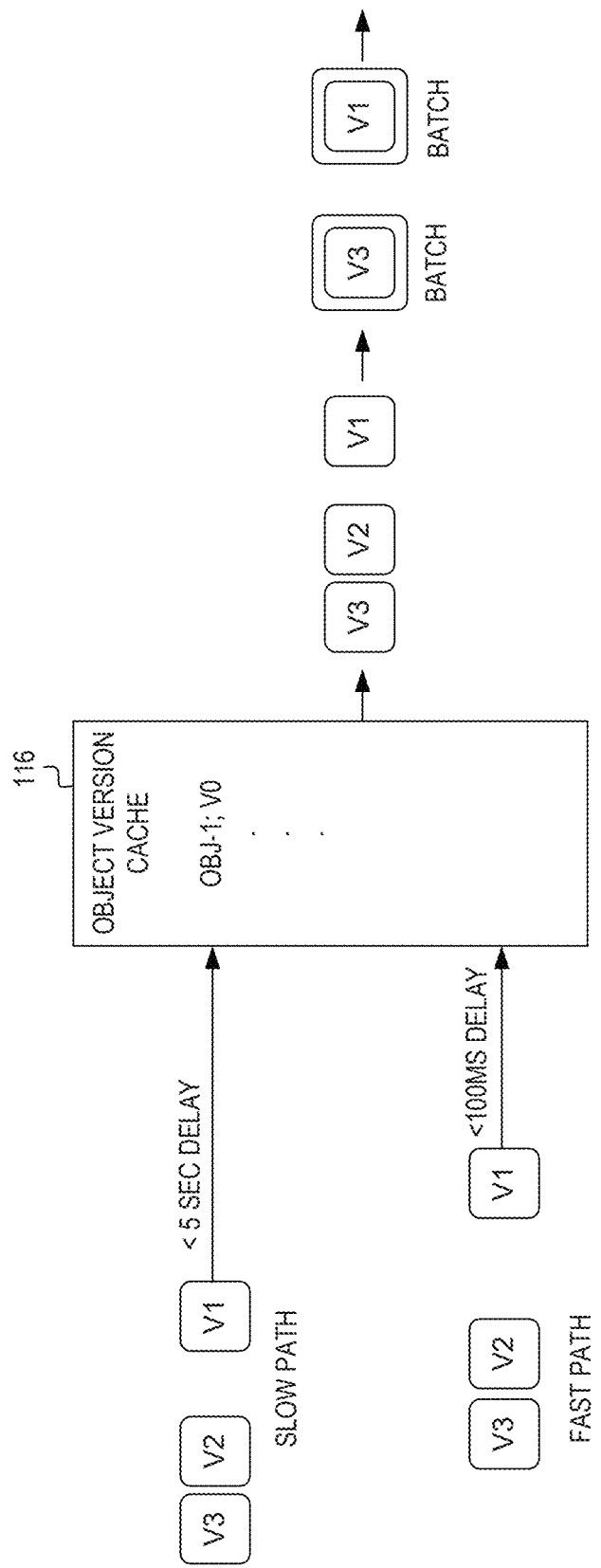
FIG. 3 is a diagram illustrating an example of version ordering in steady state, according to example embodiments.

Referring to FIG. 3, a diagram illustrating an example of version ordering in steady state is shown. In this example, a system (e.g., the architecture 100) operates under conditions where both the slow path and the fast path are likely functioning optimally, and the object version cache 116 provides a sufficiently large time window to effectively deduplicate and order events. Thus, the object version cache 116 maintains a large enough time window such that a delay in both the slow path (D_slow) and the fast path (D_fast) is less than the minimum put timestamp (min put_ts) in the object version cache 116 (D_slow<min put_ts and D_fast<min put_ts). As a result, the events from both paths can be effectively deduped and ordered by the object version cache 116. In the example of FIG. 3, the object version cache 116 provides a moving window of 10 secs, D_slow<5 secs, and D_fast<100 ms.

As shown in FIG. 3, there is a single object (object ID 1) and three versions for the single object (V1, V2, V3). The fast path is faster and ahead of the slow path. Thus, V1 from the fast path arrives before V1 from the slow path. This is true for V2 and V3. In all cases, for each incoming event, the object version cache 116 determines if the object (object ID) is already present and if so, what is the latest version (e.g., V0). If the object ID is in the object version cache 116, the incoming event version is compared with the version stored in the object version cache 116. If the incoming event has a higher version, the object version cache 116 updates with the new version. However, if the incoming event has a lower or duplicate version, it is discarded. For example, V2 from the slow path arrives after V3 from the fast path. As a result, V2 from the slow path is discarded. Similarly, because V3 is already in the object version cache 116 by the time V3 from the slow path arrives, V3 from the slow path is deduped.

After ordering the events, the versions can be grouped into batches and compacted. The batching/compaction processing is based on window of time to wait and sequence of the events. After a window of time, a latest version that has been "collected" is selected and sent. For example, because V1 came in significantly before V2 and V3, V1 is in a first window of time, while V2 and V3 (which came in essentially together) are in a second window of time. During batch formation, compaction is applied to ensure that only the latest version of each object is included in the batch. This means that if multiple versions of an object are present, only the most recent version is retained. For instance, the second batch can be compacted to include only V3.

The final batches sent to the watch client 102 may contain a sequence of versions, such as V1 and V3, or V1, V2, and V3, depending on the timing and availability of events. The key requirement is that each batch is ordered and the latest version (e.g., V3) is included, even if intermediate versions are missing. In one embodiment, the batching and compaction is performed by the compaction queue 208.

Figure 4:
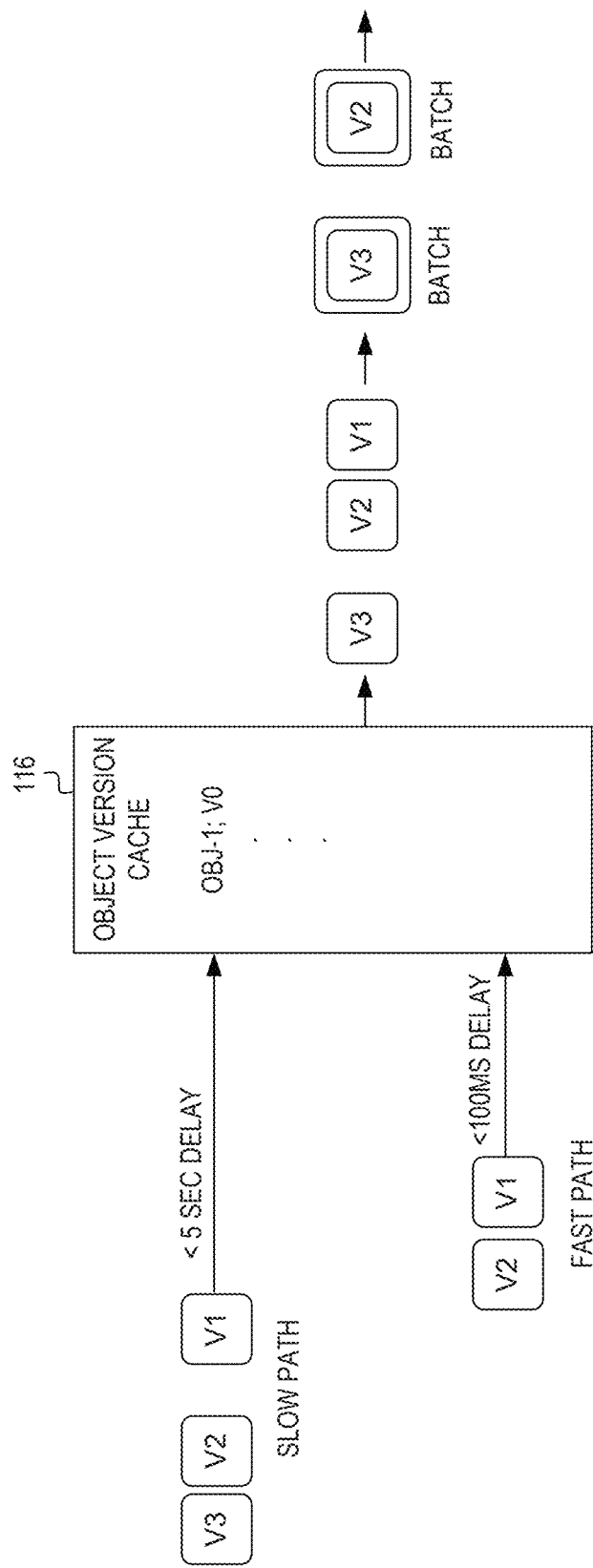
FIG. 4 is a diagram illustrating an example of version ordering when a fast path event is missing, according to example embodiments.

FIG. 4 is a diagram illustrating an example of version ordering when a fast path event is missing. While the fast path is optimized for low latency, this may occasionally result in lost events due to its non-durable nature. Assume the same time window and delays for the slow and fast paths as in FIG. 3 and that there is a single object (object ID 1) and three versions of the single object (V1, V2, V3). The current version in the object version cache 116 is version 0.

As shown, the fast path provides V1 and V2 to the object version cache 116. That means V3 has been lost on the fast path. As a result, the object version cache 116 has to wait for V3 to come in on the slow path. Thus, a first batch out of the object version cache 116 will contain V1 and V2, which can be compacted into V2 (e.g., the latest version in the batch). The second batch, which is delayed from the slow path, will contain V3. Additionally, the latest version in the object version cache 116 will be V3.

Figure 5:
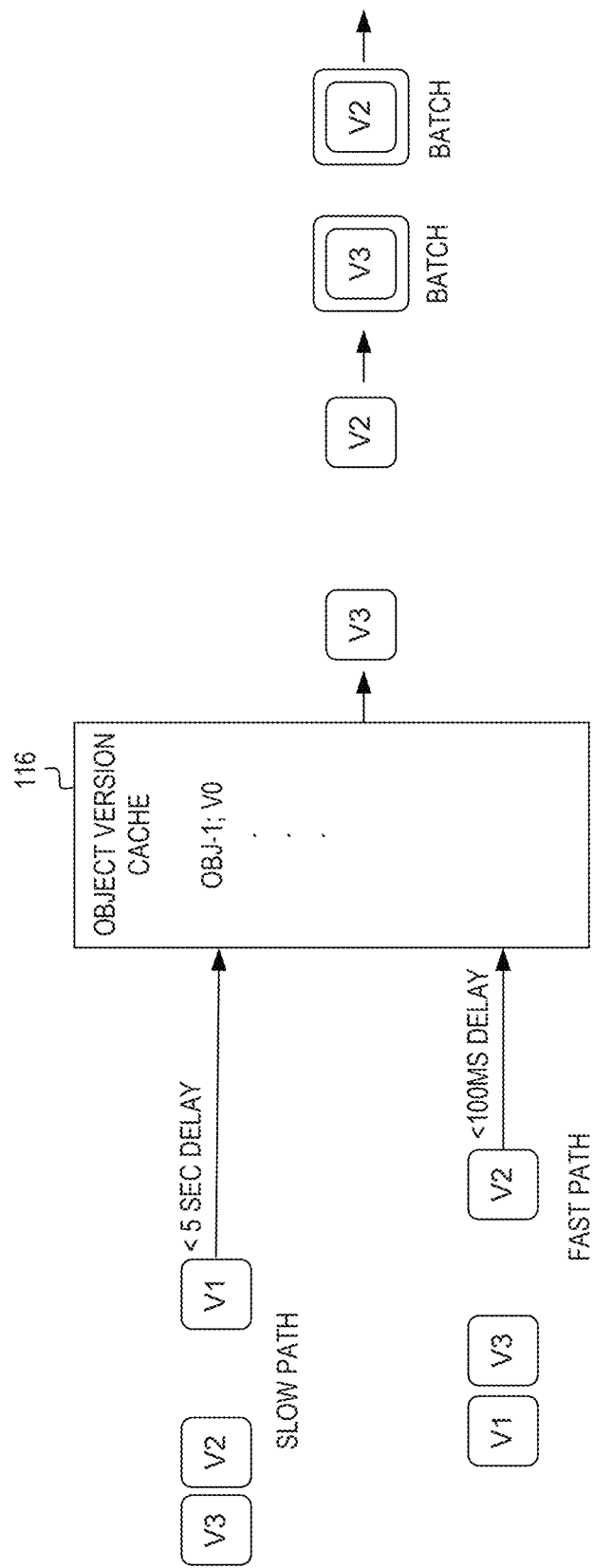
FIG. 5 is a diagram illustrating an example of version ordering with out-of-order fast path events, according to example embodiments.

FIG. 5 is a diagram illustrating an example of version ordering with out-of-order fast path events, according to example embodiments. Again, the same time window and delays for the slow and fast paths as in FIG. 3 apply. Similarly, there is a single object (object ID 1) and three versions of the single object (V1, V2, V3) with the current version in the object version cache 116 being version 0.

As discussed, the incoming event version is compared with the version stored in the object version cache 116. If the incoming event has a higher version, the object version cache 116 updates with the new version. However, if the incoming event has a lower or duplicate version, it is discarded. In the example of FIG. 5, V2 from the fast path arrives first. Because it is a higher version than the version in the object version cache 116 (e.g., V0), the object version cache 116 updates the version in the object version cache 116 to V2. V2 is then outputted in a first batch as part of a first time window.

Subsequently, V1 from the slow path arrives. Because the current version in the object version cache 116 is V2, V1 is discarded.

Next, V3 and V1 arrive on the fast path. Because V3 is higher than the version in the object version cache 116, which is V2, the object version cache 116 updates the version to V3. V1 from the fast path is discarded since it is lower.

Now when V2 and V3 from the slow path arrives, V2 is discarded because it is a lower version, while V3 is discarded because it is a duplicate. In a next time window, V3 is outputted in a second batch.

Figure 6:
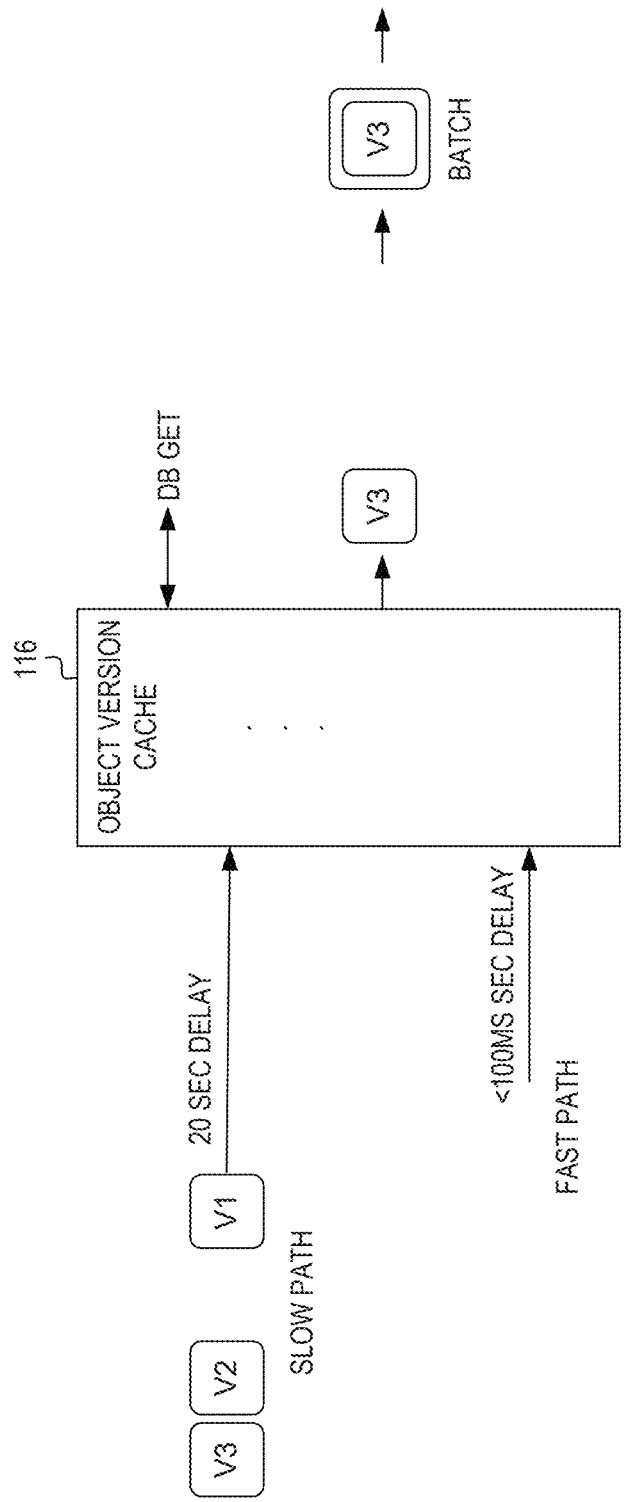
FIG. 6 is a diagram illustrating an example of version ordering that includes a delayed slow path and cache eviction, according to example embodiments.

FIG. 6 is a diagram illustrating an example of version ordering that includes a delayed slow path and cache eviction, according to example embodiments. Cache eviction is a process of removing entries from the cache (e.g., the object version cache 116) to make room for new data when the cache reaches its capacity. The cache has a fixed capacity that limits the number of unique object IDs and their versions that can be stored in the cache at any given time. As new events arrive from the fast and slow paths, they are processed and checked against the cache. If the cache is not full, a new event is added to the cache. When the cache reaches its capacity and a new event needs to be inserted, the eviction process is triggered. An oldest entry in the cache (e.g., with the earliest timestamp) is selected for removal to free up space. This ensures that the cache maintains a moving time window of the most recent events. After eviction, the new event is inserted into the cache.

The eviction process can affect the cache's ability to deduplicate and order events, especially if the evicted entry is later needed for comparison. To mitigate this, example embodiments can rely on database lookups to retrieve the latest version of an object if it is not found in the cache.

Referring to FIG. 6, the events in the slow path are significantly delayed (e.g., 20 second delay), arriving after the fast path has already delivered more recent versions of the same events. Here, V3 has already been delivered via the fast path and sent to the client in a batch. Assuming the time window is 10 seconds, the object ID associated with the events in the slow path has been evicted from the object version cache 116. Thus, when the event versions on the slow path arrive, the corresponding object ID is not in the object version cache. As a result, a timestamp (object modified timestamp, object_ts) of the V1 (from the slow path) is compared to the min put_ts of the cache. Here, the object_ts is less than min put_ts and the event is considered delayed beyond the cache's time window. As such, a database lookup is performed (DB GET ( )) to retrieve the latest version of the object.

When a lookup is performed on V1 (from the slow path), V3 is identified as the latest version in the database (e.g., database 104). Therefore, V3 gets stored in the object version cache 116 and V1 and subsequently V2 and V3 are ignored since they are lower or the same version.

Figure 7:
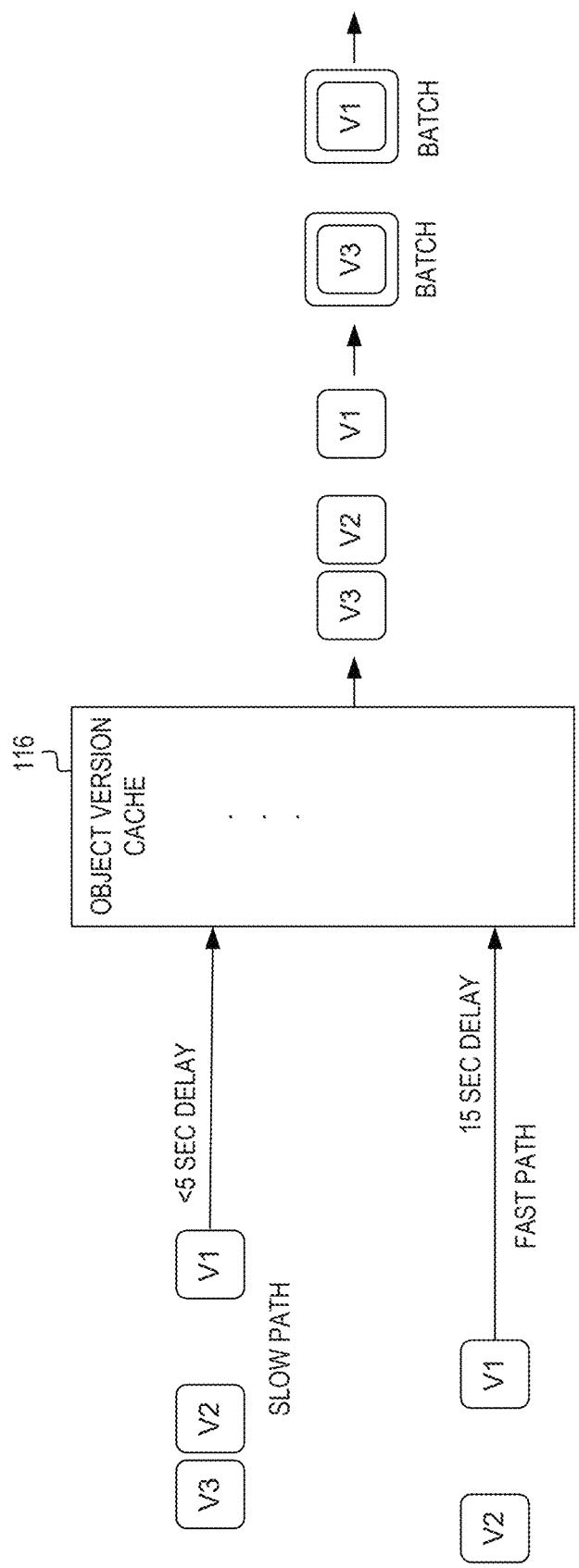
FIG. 7 is a diagram illustrating an example of version ordering that includes a delayed fast path and cache eviction, according to example embodiments.

FIG. 7 is a diagram illustrating an example of version ordering that includes a delayed fast path and cache eviction, according to example embodiments. In the example, the events in the fast path are delayed and do not arrive at the object version cache 116 until after the slow path has already delivered more recent events. As shown, the slow path has less than a 5 second delay while the fast path is delayed by 15 seconds. As a result, V1 arrives from the slow path at least 10 seconds before V1 on the fast path. Assuming a time window of 10 seconds, when V1 from the fast path arrives, the object ID may have already been evicted from the object version cache 116. Because the delayed fast path cannot guarantee durability, a lookup can be avoided since the events from the slow path (which is durable) have already been processed. Thus, V1 from the fast path is not allowed and the watch server will rely on the slow path, as the slow path guarantees no missing events and correct ordering.

In example embodiments, the fast path may be dropped and the watch server falls back to the slow path. In some embodiments, if the fast path is delayed more than a threshold amount of time, the fast path can be dropped. In one example, the threshold is two seconds. However, any threshold may be used.

Figure 8:
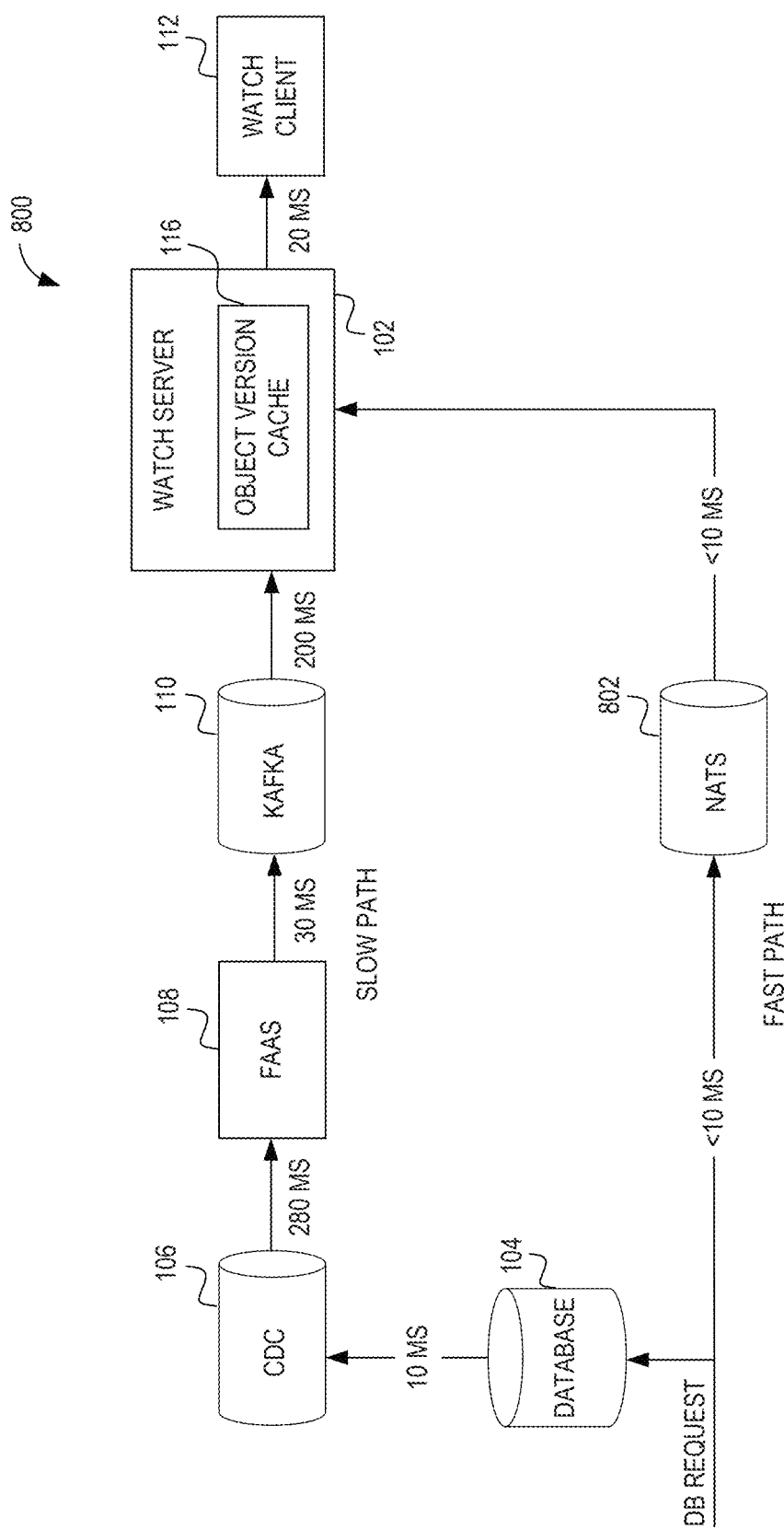
FIG. 8 is a diagram illustrating an alternative architecture for providing low latency watches, according to example embodiments.

FIG. 8 is a diagram illustrating an alternative architecture 800 for providing low latency watches, according to example embodiments. In the embodiment of FIG. 8, the fast path Kafka is replaced with an alternative fast publish/subscribe (pub/sub)—Nanosecond Asynchronous Transport System (NATS). However, other pub/sub are contemplated. NATS can provide 1-5 ms produce/consumer latency, which is a lower latency than Kafka. This results in a potential end-to-end latency of 20-30 ms or as low as 10 ms if a compaction batching window is also reduced. The NATS embodiment involves using an in-memory publish/subscribe model. In one embodiment, a single pod instance of the NATS server with sufficient memory (e.g., 4-8 GB) runs in the same Kubernetes cluster as the watch server. Since the fast path is expected to be an ephemeral real-time window, a durable event log like Kafka is not needed.

Figure 9:
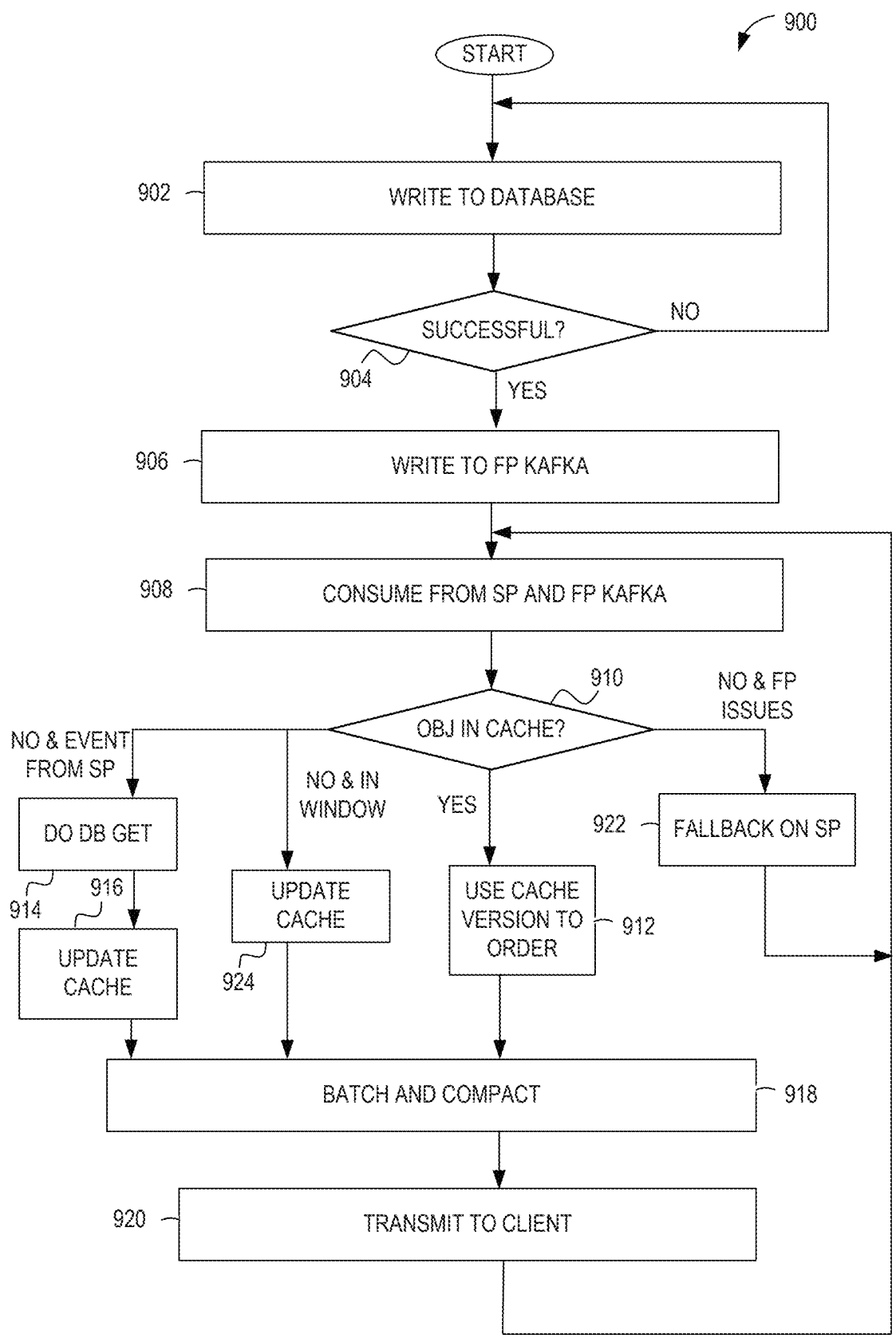
FIG. 9 is a flowchart of a method for providing low latency watches using a dual-path data streaming mechanism, according to example embodiments.

FIG. 9 is a flowchart of a method 900 for providing low latency watches using a dual-path data streaming mechanism, according to example embodiments. Operations in the method 900 may be performed by the components in the architecture 100 described above with respect to FIG. 1.

Accordingly, the method 900 is described by way of example with reference to components in the architecture 100. However, it shall be appreciated that at least some of the operations of the method 900 may be deployed on various other hardware configurations or be performed by similar components. Therefore, the method 900 is not intended to be limited to these components.

The method 900 begins with an initiation of a database (DB) create, update, delete (CUD) request, which triggers a system to write to the database 104 in operation 902. The write includes adding new data (e.g., an object) to the database 104 (i.e., create), modifying existing data in the database 104 (i.e., update), or removing data from the database 104 (i.e., delete).

In operation 904, a determination is made, by the system, whether the write was successful. If the write was not successful, the method 900 can, in some cases, return to operation 902 and attempt to rewrite to the database 104. However, if the write was successful, then a write to the fast path Kafka 114 is performed in operation 906. This write is performed asynchronously and without waiting for acknowledgments. The write to the fast path Kafka 114 can include changes resulting from the DB CUD request. Thus, after the database write operation 902 is successful, the system writes the corresponding change event that consists of a latest state of an object with corresponding event type (e.g., create, update, delete) directly to the fast path Kafka 114 (e.g., a topic in fast path Kafka 114). In some cases, for a delete, a state right before the delete can be used. The change event is the same as what will be obtained from the slow path.

In operation 908, the watch server 103 (e.g., the Kafka consumer 202) consumes from both the slow path and the fast path. Along the slow path, the changes made in the database 104 are monitored by the CDC 106, which captures the changes. The CDC 106 then stream the change events to a slow path Kafka 110 via a FaaS 108. Along the fast path, the changes are written directly into the fast path Kafka 114.

In operation 910, a determination is made, for each consumed event, whether the object ID is in the object version cache 116. If the object ID is in the object version cache 116, then in operation 912, the version in the object version cache 116 is used for ordering. Here, if the event has a version that is lower or the same, the version is discarded or deduped. However, if the event has a version that is higher, then the higher version is then used to update the object version cache 116 and is then outputted, batched, and compacted (operation 918).

However, if the object (object ID) is not in the object version cache 116, one of three different paths are taken. If the object is not in the object version cache 116, the event is from the slow path, and the event's timestamp is outside the cache's effective time window, then a database lookup (DB GET) is triggered by the watch server 102 to identify the latest version in the database 104 in operation 914. The latest version is then used to update the object version cache 116 in operation 916.

After the ordering in operations 912 and 916, the ordered events are grouped into batches and compaction is applied in operation 918. The compaction results in only the latest version of each object being retained within the batch. In operation 920, the final batch is transmitted to the client, providing a single coherent stream of ordered and deduplicated events.

Returning to operation 910, if the object ID is not in the object version cache 116, the event's timestamp is outside the cache's effective time window, and the event is from the fast path, the event is dropped and the watch server 102 falls back on the slow path in operation 922. When the fallback is activated, the watch server 102 relies on the slow path to ensure that all relevant events are delivered to the client.

Returning back to operation 910, if the object ID is not in the object version cache 116 and the event is within the cache's effective time window, the object version cache 116 is updated with this object ID and version in operation 924. The version is then outputted, batched, and compacted in operation 918 and transmitted to the client in operation 920.

Figure 10:
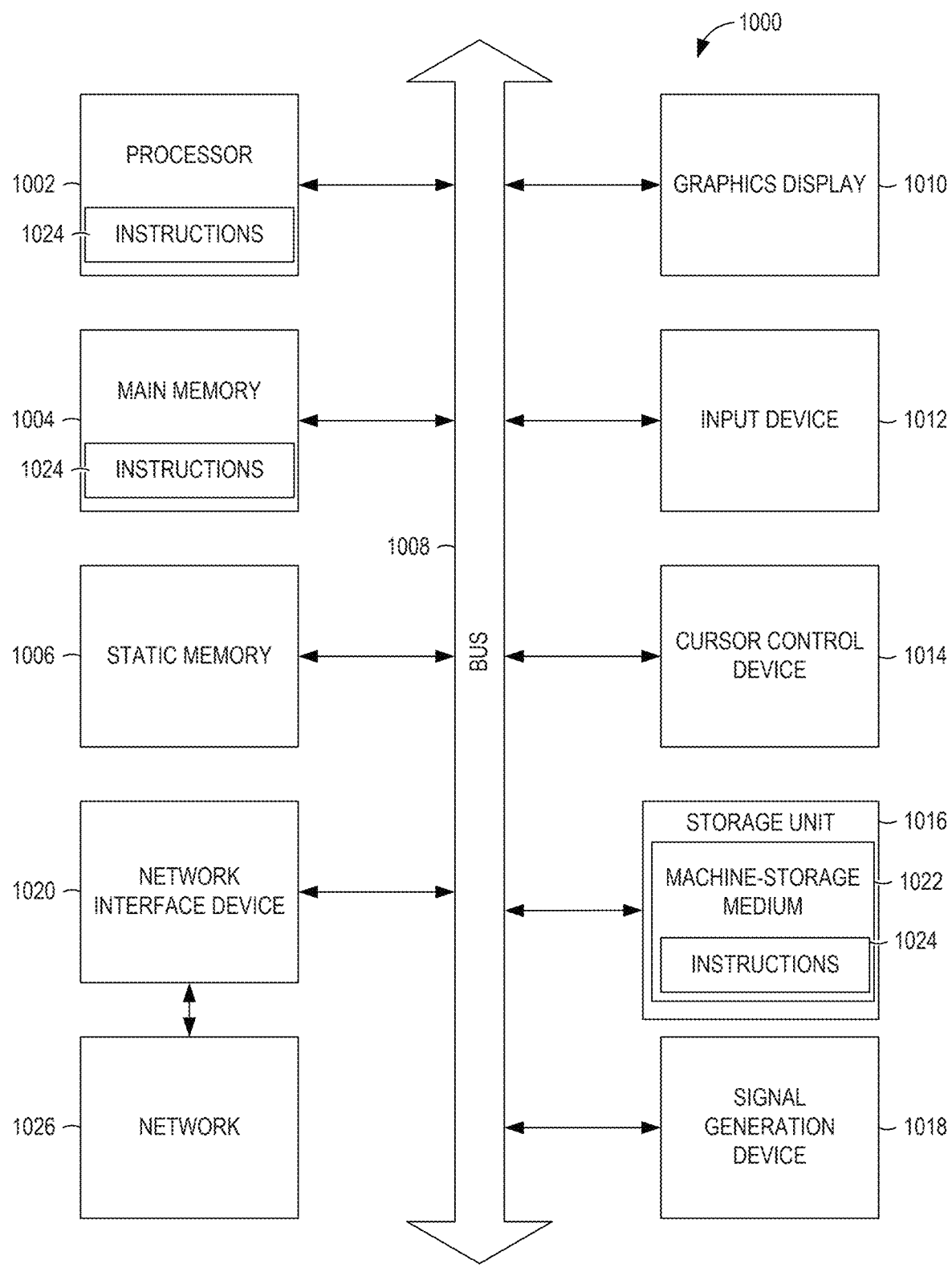
FIG. 10 is a block diagram illustrating components of a machine, according to some examples, able to read instructions from a machine-storage medium and perform any one or more of the methodologies discussed herein.

FIG. 10 illustrates components of a machine 1000, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 10 shows a diagrammatic representation of the machine 1000 in the example form of a computer device (e.g., a computer) and within which instructions 1024 (e.g., software, a program, an application, an applet, an app, or other executable code) for causing the machine 1000 to perform any one or more of the methodologies discussed herein may be executed, in whole or in part.

For example, the instructions 1024 may cause the machine 1000 to execute some or all of the diagrams and the flowchart of FIG. 9. In one embodiment, the instructions 1024 can transform the machine 1000 into a particular machine (e.g., specially configured machine) programmed to carry out the described and illustrated functions in the manner described.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024 (sequentially or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more components described herein.

The machine 1000 may further include a graphics display 1010 (e.g., a plasma display panel (PDP), a light emitting diode (LED) display, a liquid crystal display (LCD), a projector, or a cathode ray tube (CRT), or any other display capable of displaying graphics or video). The machine 1000 may also include an input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes a machine-storage medium 1022 (e.g., a tangible machine-storage medium) on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered as machine-storage media (e.g., tangible and non-transitory machine-storage media). The instructions 1024 may be transmitted or received over a network 1026 via the network interface device 1020.

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 1022 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communications network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for providing low-latency, ordered delivery of database change events to a watch client. The method comprises in response to receiving a database (DB) create, update, or delete (CUD) request, writing the DB CUD request to a cloud database, the cloud database being coupled to a change data capture (CDC) component that sends change events to a slow path publish/subscribe (pub/sub) system of a slow path; based on a successful write to the cloud database, asynchronously writing a corresponding change event to a fast path pub/sub system of a fast path; consuming, at a watch server, slow path change events from the slow path pub/sub system and fast path change events from the fast path pub/sub system; merging and ordering the slow path change events and the fast path change events using a first-in first-out (FIFO) cache, each change event comprises an object identifier and a version; and transmitting an ordered event stream to the watch client that includes one or more batches, each batch comprising a most recent event version for each object that was changed based on the DB CUD request.

In example 2, the subject matter of example 1 can optionally include wherein the slow path pub/sub or the fast path pub/sub system comprises Kafka.

In example 3, the subject matter of any of examples 1-2 can optionally include wherein the fast path pub/sub system comprises Nanosecond Asynchronous Transport System (NATS).

In example 4, the subject matter of any of examples 1-3 can optionally include wherein the merging comprises determining whether an object identifier of a slow path change event is in the FIFO cache; based on the object identifier not being in the FIFO cache, determining whether a timestamp of the slow path change event is outside of a time window of the FIFO cache; and based on the timestamp of the slow path change event being outside the time window, performing a database lookup for a latest version associated with the object identifier of the slow path change event.

In example 5, the subject matter of any of examples 1–4 can optionally include wherein the merging comprises compensating for a missing fast path change event by relying on the slow path to provide a slow path change event that corresponds to the missing fast path change event.

In example 6, the subject matter of any of examples 1-5 can optionally include wherein the merging comprises determining whether an object identifier of a change event is in the FIFO cache; and based on the object identifier of a change event being in the FIFO cache, using a version corresponding to the object identifier cached in the FIFO cache to determine an order of change events.

In example 7, the subject matter of any of examples 1-6 can optionally include further comprising falling back on the slow path when the fast path change events are delayed a threshold amount of time or beyond a cache time window.

In example 8, the subject matter of any of examples 1-7 can optionally include compacting the ordered event stream by retaining only a most recent change event version for each object identifier within each batch.

In example 9, the subject matter of any of examples 1-8 can optionally include adjusting a polling interval of a consumer of the watch server consuming from the fast path pub/sub system.

In example 10, the subject matter of any of examples 1-9 can optionally include configuring a system that hosts a remote procedure call framework for DB CUD requests to write to the database, check for the successful write to the database, and write the corresponding change events to the fast path pub/sub system.

In example 11, the subject matter of any of examples 1-10 can optionally include wherein the asynchronously writing to the fast path pub/sub system occurs without waiting on the slow path pub/sub to respond back to the DB CUD request.

In example 12, the subject matter of any of examples 1-11 can optionally include wherein the fast path pub/sub system comprise a single topic for all types or kinds.

Example 13 is a system for providing low-latency, ordered delivery of database change events to a watch client. The system comprises one or more processors and a memory storing instructions that, when executed by the one or more processors, cause the one or more processors to perform operations comprising in response to receiving a database (DB) create, update, or delete (CUD) request, writing the DB CUD request to a cloud database, the cloud database being coupled to a change data capture (CDC) component that sends change events to a slow path publish/subscribe (pub/sub) system of a slow path; based on a successful write to the cloud database, asynchronously writing a corresponding change event to a fast path pub/sub system of a fast path; consuming, at a watch server, slow path change events from the slow path pub/sub system and fast path change events from the fast path pub/sub system; merging and ordering the slow path change events and the fast path change events using a first-in first-out (FIFO) cache, each change event comprises an object identifier and a version; and transmitting an ordered event stream to the watch client that includes one or more batches, each batch comprising a most recent event version for each object that was changed based on the DB CUD request.

In example 14, the subject matter of example 13 can optionally include wherein the merging comprises determining whether an object identifier of a slow path change event is in the FIFO cache; based on the object identifier not being in the FIFO cache, determining whether a timestamp of the slow path change event is outside of a time window of the FIFO cache; and based on the timestamp of the slow path change event being outside the time window, performing a database lookup for a latest version associated with the object identifier of the slow path change event.

In example 15, the subject matter of any of examples 13-14 can optionally include wherein the merging comprises compensating for a missing fast path change event by relying on the slow path to provide a slow path change event that corresponds to the missing fast path change event.

In example 16, the subject matter of any of examples 13-15 can optionally include wherein the merging comprises determining whether an object identifier of a change event is in the FIFO cache; and based on the object identifier of a change event being in the FIFO cache, using a version corresponding to the object identifier cached in the FIFO cache to determine an order of change events.

In example 17, the subject matter of any of examples 13-16 can optionally include wherein the operations further comprise falling back on the slow path when the fast path change events are delayed a threshold amount of time or beyond a cache time window.

In example 18, the subject matter of any of examples 13-17 can optionally include wherein the operations further comprise compacting the ordered event stream by retaining only a most recent change event version for each object identifier within each batch.

In example 19, the subject matter of any of examples 13-18 can optionally include wherein the merging comprises determining whether an object identifier of a change event is in the FIFO cache; based on the object identifier not being in the FIFO cache, determining whether a timestamp of the change event is outside of a time window of the FIFO cache; and based on the timestamp of the change event being within the time window, updating the FIFO cache with the object identifier and version of the change event and outputting the version to the watch client.

Example 20 is a machine-storage medium comprising instructions which, when executed by one or more processors of a machine, cause the machine to perform operations for providing low-latency, ordered delivery of database change events to a watch client. The operations comprise in response to receiving a database (DB) create, update, or delete (CUD) request, writing the DB CUD request to a cloud database, the cloud database being coupled to a change data capture (CDC) component that sends change events to a slow path publish/subscribe (pub/sub) system of a slow path; based on a successful write to the cloud database, asynchronously writing a corresponding change event to a fast path pub/sub system of a fast path; consuming, at a watch server, slow path change events from the slow path pub/sub system and fast path change events from the fast path pub/sub system; merging and ordering the slow path change events and the fast path change events using a first-in first-out (FIFO) cache, each change event comprises an object identifier and a version; and transmitting an ordered event stream to the watch client that includes one or more batches, each batch comprising a most recent change event version for each object that was changed based on the DB CUD request.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method for providing low-latency, ordered delivery of database change events to a watch client, the method comprising:
   receiving a database (DB) create, update, or delete (CUD) request;
   in response to receiving the DB CUD request, writing the DB CUD request to a cloud database, the cloud database being coupled to a change data capture (CDC) component that sends change events to a slow path publish/subscribe (pub/sub) system of a slow path;
   based on a successful write to the cloud database, asynchronously writing a corresponding change event to a fast path pub/sub system of a fast path;
   consuming, at a watch server, slow path change events from the slow path pub/sub system and fast path change events from the fast path pub/sub system;
   merging and ordering the slow path change events and the fast path change events using a first-in first-out (FIFO) cache, each change event comprises an object identifier and a version, the merging comprising:
      determining whether an object identifier of a slow path change event is in the FIFO cache;
      based on the object identifier not being in the FIFO cache, determining whether a timestamp of the slow path change event is outside of a time window of the FIFO cache; and
      based on the timestamp of the slow path change event being outside the time window, performing a database lookup for a latest version associated with the object identifier of the slow path change event; and
   transmitting an ordered event stream to the watch client that includes one or more batches, each batch comprising a most recent event version for each object that was changed based on the DB CUD request.

2. The method of claim 1, wherein the slow path pub/sub system or the fast path pub/sub system comprises Kafka.

3. The method of claim 1, wherein the fast path pub/sub system comprises Nanosecond Asynchronous Transport System (NATS).

4. The method of claim 1, wherein the merging further comprises compensating for a missing fast path change event by relying on the slow path to provide a slow path change event that corresponds to the missing fast path change event.

5. The method of claim 1, wherein the merging further comprises:
   determining whether an object identifier of a change event is in the FIFO cache; and
   based on the object identifier of the change event being in the FIFO cache, using a version corresponding to the object identifier cached in the FIFO cache to determine an order of change events.

6. The method of claim 1, further comprising falling back on the slow path when the fast path change events are delayed a threshold amount of time or beyond a cache time window.

7. The method of claim 1, further comprising:
compacting the ordered event stream by retaining only a most recent change event version for each object identifier within each batch.

8. The method of claim 1, further comprising:
adjusting a polling interval of a consumer of the watch server consuming from the fast path pub/sub system.

9. The method of claim 1, further comprising:
configuring a system that hosts a remote procedure call framework for DB CUD requests to write to the database, check for the successful write to the database, and write the corresponding change events to the fast path pub/sub system.

10. The method of claim 9, wherein the asynchronously writing to the fast path pub/sub system occurs without waiting on the slow path pub/sub system to respond back to the DB CUD request.

11. The method of claim 1, wherein the fast path pub/sub system comprise a single topic for all types or kinds.

12. A system for providing low-latency, ordered delivery of database change events to a watch client, the system comprising:
one or more processors; and
a memory storing instructions that, when executed by the one or more processors, cause the one or more processors to perform operations comprising:
receiving a database (DB) create, update, or delete (CUD) request;
in response to receiving the DB CUD request, writing the DB CUD request to a cloud database, the cloud database being coupled to a change data capture (CDC) component that sends change events to a slow path publish/subscribe (pub/sub) system of a slow path;
based on a successful write to the cloud database, asynchronously writing a corresponding change event to a fast path pub/sub system of a fast path;
consuming, at a watch server, slow path change events from the slow path pub/sub system and fast path change events from the fast path pub/sub system;
merging and ordering the slow path change events and the fast path change events using a first-in first-out (FIFO) cache, each change event comprises an object identifier and a version, the merging comprising:
determining whether an object identifier of a change event is in the FIFO cache;
based on the object identifier not being in the FIFO cache, determining whether a timestamp of the change event is outside of a time window of the FIFO cache; and
based on the timestamp of the change event being within the time window, updating the FIFO cache with the object identifier and version of the change event and outputting the version to the watch client; and
transmitting an ordered event stream to the watch client that includes one or more batches, each batch comprising a most recent event version for each object that was changed based on the DB CUD request.

13. The system of claim 12, wherein the merging further comprises:
determining whether an object identifier of a slow path change event is in the FIFO cache;
based on the object identifier not being in the FIFO cache, determining whether a timestamp of the slow path change event is outside of a time window of the FIFO cache; and
based on the timestamp of the slow path change event being outside the time window, performing a database lookup for a latest version associated with the object identifier of the slow path change event.

14. The system of claim 12, wherein the merging further comprises compensating for a missing fast path change event by relying on the slow path to provide a slow path change event that corresponds to the missing fast path change event.

15. The system of claim 12, wherein the merging further comprises:
determining whether an object identifier of a change event is in the FIFO cache; and
based on the object identifier of a change event being in the FIFO cache, using a version corresponding to the object identifier cached in the FIFO cache to determine an order of change events.

16. The system of claim 12, wherein the operations further comprise:
falling back on the slow path when the fast path change events are delayed a threshold amount of time or beyond a cache time window.

17. The system of claim 12, wherein the operations further comprise:
compacting the ordered event stream by retaining only a most recent change event version for each object identifier within each batch.

18. A machine-storage medium comprising instructions which, when executed by one or more processors of a machine, cause the machine to perform operations for providing low-latency, ordered delivery of database change events to a watch client, the operations comprising:
receiving a database (DB) create, update, or delete (CUD) request;
in response to receiving the DB CUD request, writing the DB CUD request to a cloud database, the cloud database being coupled to a change data capture (CDC) component that sends change events to a slow path publish/subscribe (pub/sub) system of a slow path;
based on a successful write to the cloud database, asynchronously writing a corresponding change event to a fast path pub/sub system of a fast path;
consuming, at a watch server, slow path change events from the slow path pub/sub system and fast path change events from the fast path pub/sub system;
merging and ordering the slow path change events and the fast path change events using a first-in first-out (FIFO) cache, each change event comprises an object identifier and a version, the merging comprising:
determining whether an object identifier of a slow path change event is in the FIFO cache;
based on the object identifier not being in the FIFO cache, determining whether a timestamp of the slow path change event is outside of a time window of the FIFO cache; and
based on the timestamp of the slow path change event being outside the time window, performing a database lookup for a latest version associated with the object identifier of the slow path change event; and
transmitting an ordered event stream to the watch client that includes one or more batches, each batch comprising a most recent change event version for each object that was changed based on the DB CUD request.

* * * * *